United States Patent Office 3,264,116
Patented August 2, 1966

3,264,116
PROCESS FOR PREPARING DRY FLAVORING MATERIALS FROM CRUSTACEANS
Robert D. Gray, 6 Clarendon St., Gloucester, Mass.
No Drawing. Filed Nov. 3, 1964, Ser. No. 408,637
4 Claims. (Cl. 99—140)

This application is a continuation-in-part application of Serial No. 170,819, filed February 2, 1962, and now abandoned.

This invention relates generally to food products adapted for human consumption and has particular reference to a food flavoring material prepared from an edible crustacean and to a method of manufacture thereof from selected materials.

It would be desirable to provide a stable flavoring material for food products of various types which will impart thereto a flavor of certain edible crustaceans, for example, the flavor of lobster, shrimp, and crabs. Such a flavoring material should be capable of prolonged storage without refrigeration and also without deterioration or loss of flavoring power. Preferably a relatively low amount of moisture is present. Although many attempts have been made to provide a stable material having a flavor of the type described, none has previously been commercially successful, either because of excessive production costs, unsuitable storage qualities, or failure to impart a satisfactory flavor to human food products, or a combination of these undesirable characteristics.

An object of this invention is to provide a flavoring material adapted for addition to food products for imparting thereto the flavor of an edible crustacean, which flavoring material is economical to manufacture and which is capable of being stored satisfactorily for long periods of time without either spoilage or loss of flavor.

A further object of this invention is to provide a method of manufacturing a flavoring material of the type described which utilizes only certain portions of the crustacean which are normally discarded in commercial processing.

Another object of the invention is the commercial utilization to give an economic product from a previously useless by-product requiring disposal.

Other objects of the invention will be apparent to one skilled in the art from the following more detailed description of the invention.

In the commercial preparation of edible crustaceans such as lobster, crabs, and shrimp for food products, it is customary to first cook the whole crustacean in boiling water, steam, or hot air, after which the edible meat portions are separated from the shell for canning, freezing, or other utilization in appropriate food products. The shells as well as other inedible parts such as viscera, heads, etc., are discarded as having no commercial value, and must be promptly disposed of, since they putrefy rapidly causing sanitation problems.

It has been discovered that the relatively useless by-product shells, unremoved flesh and fiber can be utilized to provide a food flavoring material by a suitable series of processing steps. This food flavoring material has been found to be entirely useful for human consumption as indicated by storage characteristics, stability, flavor and bacterial count both immediately after preparation and following storage.

The process briefly includes the steps of preparing the raw material from the cooked shell and fibrous portions from which the meat has previously been removed for preparation as foodstuffs for human consumption.

As soon as possible after the meat is removed from the crustacean shells, and before sufficient time has passed to permit any deterioration, the cooked shells and fibrous portions are washed with water, either fresh or salt, to remove the viscera and like wastes from the shell and fibrous portions.

The shells and fibrous sections which are the final raw material for the food flavoring are then preferably wet milled. This milling step can be carried out using conventional apparatus for wet milling. Additional water may be introduced to aid milling, but this is not necessary. Two or more mills may be used, one for pregrinding and one for fine grinding. A whirling blade commutator has been found very useful in pregrinding while a colloid mill has been found very useful in fine grinding although other apparatus can be used. The particle size of the suspended solids in the slurry formed by milling should be fine enough to allow subsequent drying by whatever drying method is used.

The concentration of the slurry formed in the milling step is not critical but is at least 5% solids and preferably higher to minimize as much as possible the water evaporation required in the subsequent drying step.

After preparation, the slurry is preferably acidified to stabilize the liquid thus minimizing bacterial growth both during processing and in the final product. This acidification step while not necessary is desirable in that it simplifies production of a bacterially stable food flavoring material. Any food grade acid either organic or inorganic may be used in this stabilization step. Preferred acids are citric, hydrochloride, phosphoric lactic and the like. The final pH of the slurry is preferably in the range of 4.5–8.0.

The slurry is dried in any conventional manner to produce the desired flavoring material. Spray drying is preferred because of the speed, ease and lack of detrimental effect on the flavor, although other forms of drying can be used. For spray drying, the slurry particle size is preferably in the range 10–100$\mu$. The desired food flavoring material is obtained directly from the drying step.

While the aforementioned is the preferred process for production of the food flavors which are the subject of this invention, another embodiment of the invention may be used.

After washing, rather than wet milling the shell and fibrous portions they are initially dried. The drying operation may be carried out using any conventional drying equipment as for example tray or apron dryers.

This drying step may be carried out by the application of heat, vacuum or both. It is continued until the feedstock is reduced to at least below 5% moisture. It has been found most convenient to dry under reduced pressure allowing passage of hot air preferably at a temperature of between 180° F. and 212° F. Great care must be taken during the drying operation to prevent decomposition of the material during drying.

After drying the crustacean can then be dry milled using any conventional milling apparatus. Hammer mills have been found particularly suitable for this grinding operation. The optimum particle size for food flavoring prepared by this process is preferably in the range 100–200 mesh.

The finished powder may, if desired, then be acidified in a similar manner to that described heretofore.

Regardless of the process used to produce the food flavoring powder, it may be packaged in any suitable manner, such as in ordinary screw cap jars, for home use, or in polyethylene bags for bulk shipment to commercial food processors. It has been found that no unusual precautions need be taken in packaging, since the powder is not hygroscopic, and does not deteriorate in flavoring power or increase in bacterial count, even during long periods of unrefrigerated storage. Bacteria counts for foods derived from fish are generally required to have a plate count of less than 50,000. A batch of flavoring powder manufactured by the latter described method, after six months unrefrigerated storage, was found to have a plate count of only 2000, a most surprising and unexpected characteristic of the material.

The flavoring material disclosed herein may be utilized in the manufacture and preparation of many types of food products, such as sauces, cheese, crackers, and the like. For many products, addition of the powder in the proportion of about .1% by weight imparts a suitable flavor thereto. The flavor may be enhanced if desired by the addition of a flavor intensifier such as mono-sodium glutamate, and for special flavors, powders prepared from different types of crustaceans may be mixed.

*Example 1*

About 40 lbs. of shell and fibrous portions obtained from lobsters which had been previously cooked in boiling salt water were washed to remove the viscera. The shells were than milled wet in a whirling blade commutator to a particle size below 1/8" average diameter. This milled material was then fed to a colloid mill and further milled to give a particle size in the range 5–100$\mu$. The slurry obtained was 9% by weight solids. The slurry was acidified to a pH of 7.0 by addition of citric acid. The acidified slurry was then spray dried giving a product having about 5% moisture and a low bacterial count. The product was stable in long storage without refrigeration and its flavor did not change. It was found to impart a very excellent flavor to crackers and cheese dip and was entirely fit and well adapted to human consumption.

*Example 2*

About 44 lbs. of shell and fibrous portions obtained from lobsters which had been previously cooked were washed to remove the viscera. The shells were then put in a tray dryer operating under 15" vacuum at about 210° F. and dried overnight. The dried lobster was then milled in a whirling blade commutator to a particle size 1/8–1/4". The preground material was then micropulverized to a particle size 100% 100 mesh. The pH of the powder was adjusted to about 8.0 by addition of citric acid and was ready for use as a flavoring agent. The product was found to be stable on storage and imparted a very excellent flavor to crackers and cheese dips.

Since certain obvious changes may be made in the herein described embodiments of the invention, it is intended that all matter contained herein be interpreted in an illustrative and not in a limiting sense.

What is claimed is:

1. A process for conversion of by-products into food flavoring materials suitable for human consumption which comprises the steps of cooking an edible crustacean, separating at least a portion of the edible meat portion therefrom, separating and discarding inedible parts, wet milling the remaining portion including shells to yield at least a 5% solids slurry of particles in the size of 10 to 100$\mu$, acidifying the resulting slurry to a pH in the range of 4.5 to 8.0 by addition of a food grade acid, and spray drying the resulting acidified slurry to yield a dry, particulate edible food material.

2. The process of claim 1 wherein the crustacean employed is lobster.

3. The process of claim 1 wherein the crustacean employed is shrimp.

4. The process of claim 1 wherein the crustacean employed is crab.

References Cited by the Examiner

UNITED STATES PATENTS

| | | | |
|---|---|---|---|
| 1,824,685 | 9/1931 | Pittock | 99—209 |
| 2,622,027 | 12/1952 | Torr | 99—107 |
| 2,669,520 | 2/1954 | Fellers | 99—111 X |

FOREIGN PATENTS

| | | |
|---|---|---|
| 926,453 | 5/1963 | Great Britain. |

OTHER REFERENCES

"Cassell's Dictionary of Cookery," 1881, Cassell, Petter, Galpin and Co., New York, pp. 870, 386 and 868.

Chao: "How to Cook and Eat in Chinese," 1949, The John Day Co., New York, p. 149.

Reddish: "Antiseptics, Disinfectants, Fungicides, and Chemical and Physical Sterilization," 1957, Lea and Febeger, Philadelphia, p. 670.

Seiden et al.: "The Handbook of Feedstuffs," 1957, Springer Publishing Co., Inc., New York, p. 282.

A. LOUIS MONACELL, *Primary Examiner.*

J. M. GOLIAN, *Assistant Examiner.*